United States Patent

[11] 3,602,820

[72] Inventor Barry M. Kaufman
Santa Clara, Calif.
[21] Appl. No. 764,394
[22] Filed Oct. 2, 1968
[45] Patented Aug. 31, 1971
[73] Assignee Computer Equipment Corporation

[54] TUNABLE TONE SQUELCH ENCODER-DECODER INCORPORATING AN ACTIVE FILTER FEEDBACK TUNING NETWORK
4 Claims, 6 Drawing Figs.

[52] U.S. Cl. .......... 325/348, 325/55, 330/103
[51] Int. Cl. .......... H04b 5/10
[50] Field of Search .......... 325/55, 64, 392, 348, 478; 340/171; 330/103

[56] References Cited
UNITED STATES PATENTS

| | | | |
|---|---|---|---|
| 3,356,962 | 12/1967 | Morgan | 330/103 |
| 3,138,755 | 6/1964 | Kompelein | 325/55 |
| 3,292,085 | 12/1966 | Black | 325/55 |
| 3,387,212 | 6/1968 | Kaurman | 325/55 |
| 3,441,854 | 4/1969 | Cole | 325/64 |
| 3,467,869 | 9/1969 | Forge | 325/55 |

OTHER REFERENCES

Farrer, " A Simple Active Filter with Independent Control over the Pole and Zero Locations," Electronic Engineering, April, 1967, pgs. 219- 22 (330- 31)
Hassel, " Single-Tone Calling Simplifies Mobile Radio," Electronics, May, 1955, pages 144- 148, (325- 55) copy made in group 230.

*Primary Examiner*—Robert L. Griffin
*Assistant Examiner*—James A. Brodsky
*Attorney*—Eckhoff and Hoppe

ABSTRACT: A solid state tunable controlled squelch device is provided for a radio system having an encoder-decoder with a tunable band pass frequency filter including a null frequency selective network. The network may be either continuously tunable or may be switched to a number of adjusted frequencies.

INVENTOR.
BARRY M. KAUFMAN

BY

ATTORNEYS

INVENTOR.
BARRY M. KAUFMAN

BY [signature]
ATTORNEYS

INVENTOR.
BARRY M. KAUFMAN
BY [signature]
ATTORNEYS

INVENTOR.
BARRY M. KAUFMAN
BY
ATTORNEYS

INVENTOR.
BARRY M. KAUFMAN

BY [signature]
ATTORNEYS

TUNABLE TONE SQUELCH ENCODER-DECODER INCORPORATING AN ACTIVE FILTER FEEDBACK TUNING NETWORK

SUMMARY OF THE INVENTION

This invention relates to a tunable, all-electric continuous tone squelch, encoding and encoding-decoding device. It will be described in conjunction with an FM system although it is applicable to any modulation system.

Interference, particularly on the heavily congested VHF 2-way radio channels, is an ever-increasing problem. Business radio channels in the heavily populated metropolitan areas may have as many as 40 systems operating simultaneously. Operators whose radios are not equipped with some form of tone squelch must listen to all conversations on the channel from transmitters that are within range. This is both annoying and fatiguing and some operators will even go so far as to turn their volume control down in order to avoid the interference, the result being that even desired messages are not received. The use of tone squelch to alleviate the annoyance is not new. The standard for subaudible continuous tone controlled squelch systems (CTCSS) is covered in Electronic Industries Association (EIA) Standard RS-220 published in Apr. of 1959.

Basically, the system operates as follows:

Each radio transmitter in the particular radio system is equipped with a tone encoder operating on one of the 33 standard EIA channels between 67.0 and 250.3 Hz.

When the transmitter is keyed, the operator's voice modulates said transmitter in the 300 to 3000 cycle range and, simultaneous with voice, the subaudible tone modulates the transmitter as well.

Tone FM deviation of the transmitter is typically set approximately 14 DB below voice FM deviation.

Receivers within the radio system are equipped with a tone decoder tuned to the same tone frequency as the tone encoder within the transmitters of the system. This decoder normally holds the receiver in the squelched mode. If a received signal is not modulated with tone or is modulated with tone that is not on the decoder frequency, then the receiver will remain squelched and the operator will not hear the interference. If a transmitter within the radio system is received having a tone corresponding to the frequency of the tone decoder, the receiver will be unsquelched and the operator will receive the message.

Another application is the use of subaudible tone to control radio repeaters and other devices. A radio repeater is a mountain top, hill top or other favorable geographic position receiver-transmitter which retransmits a received radio signal. The radio repeater greatly extends the range of the radio system. A system need not be limited to one radio repeater. As an example, Humbolt County California located in a very mountainous area, employs five radio repeaters, each located in a different section of the county. Since all repeaters are on the same frequency, it is undesirable to have more than one operative at a time as beat notes will result in overlapping coverage areas. One method of avoiding this problem is to equip each mobile unit and each dispatch station with a multifrequency continuous tone encoder. Each repeater is equipped with a tone decoder and each repeaters's decoder frequency is unique but corresponds to one of the encoder frequencies. A repeater will only come on the air if it receives tone on its assigned decode frequency.

Numerous other applications are possible using subaudible tones such as identifying a particular vehicle out of a plurality of vehicles, alarm and control signaling applications, switching radio receiver or transmitter frequencies, switching communications circuits, etc.

The majority of tone squelch systems now being manufactured employ vibrating mechanical resonant reeds. Until very recently, it was difficult to employ electronic means for generating and decoding these low tone frequencies. Inductors are not suitable in standard LC circuits because of their weight, size and low Q at these low frequencies. RC active filters, although tried, did not prove effective because of the use of vacuum tubes with resultant high heat generation causing a drift in the frequency control RC components. Other factors involved with vacuum tube circuitry, such as vacuum tube characteristics changing with age, cause the circuits to be very unstable. Vibrating mechanical resonant reeds suffer from short life and false operation when subject to vibration encountered in vehicular two-way radio service.

The present invention meets the requirements of the above mentioned EIA specification, is all-electronic and all silicon solid state and has the added major feature of being tunable over a wide frequency range. As mentioned above, there are 33 EIA tone squelch channels. This involves the stocking of 33 types of encoding reeds and 33 types of decoding reeds by radio equipment manufacturers and equipment dealers, distributors and service stations. Previous vacuum tube all electronic tube squelch equipment required a network for each tone channel. There have been many times when a tone squelched equipped radio system was installed, proved to work quite well, but at a later date another system was put on the channel utilizing the same tone squelch frequency. This required that one of the systems change its tone frequency in order to eliminate interference. If resonant reeds or RC networks are employed, they must be replaced by reeds or networks of the other frequency. Long lead times are involved as service organizations rarely stock the high level of frequency control components required for this type changeout. The present invention involves a continuously tunable frequency control network whereby frequency can be changed by simply turning a trimmer potentiometer or other suitable single component controlling device. The tremendous economic advantage of not having to stock a large variety of individual frequency control networks is quite obvious.

Figure 1A:
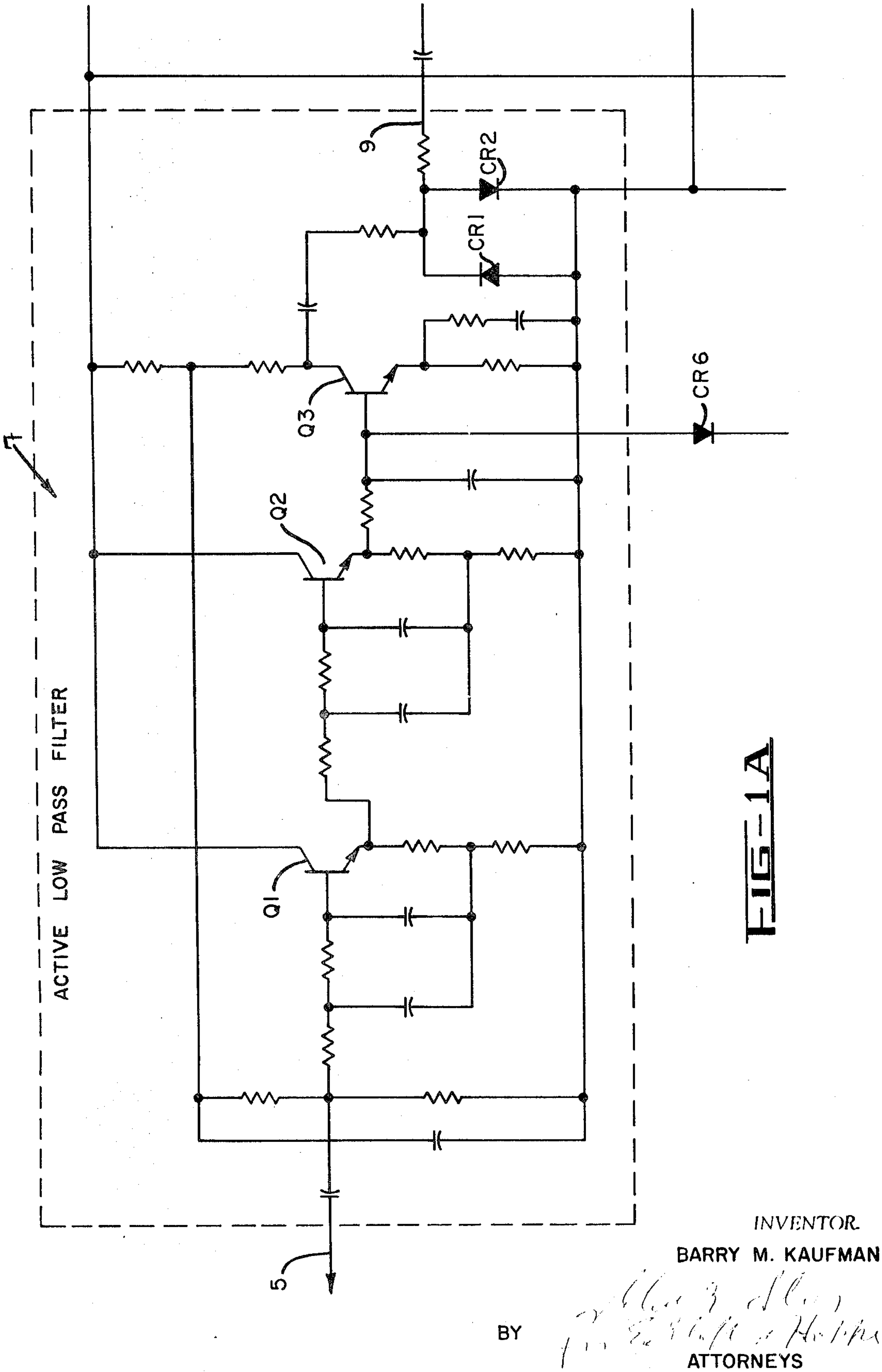
FIGS. 1A–C is a schematic diagram of an encoder-decoder embodying the present invention.

In the drawings all resistors specified are in ohms (K=1,000) all capacitors are in microfarads, all field effect transistors are of the "N " channel type, all NPN transistors are equivalent to 2N3565, all PNP transistors are equivalent to 2N4250 and all diodes are equivalent to 1N457.

DESCRIPTION OF THE PREFERRED EMBODIMENTS

In the description which follows, only those of values of the components are given which are essential to understanding the present invention. Other values will be apparent to those skilled in the art. Further, the exact values given are for purposes of illustration only and are not intended to limit the scope of the invention in any manner.

Figure 1B:
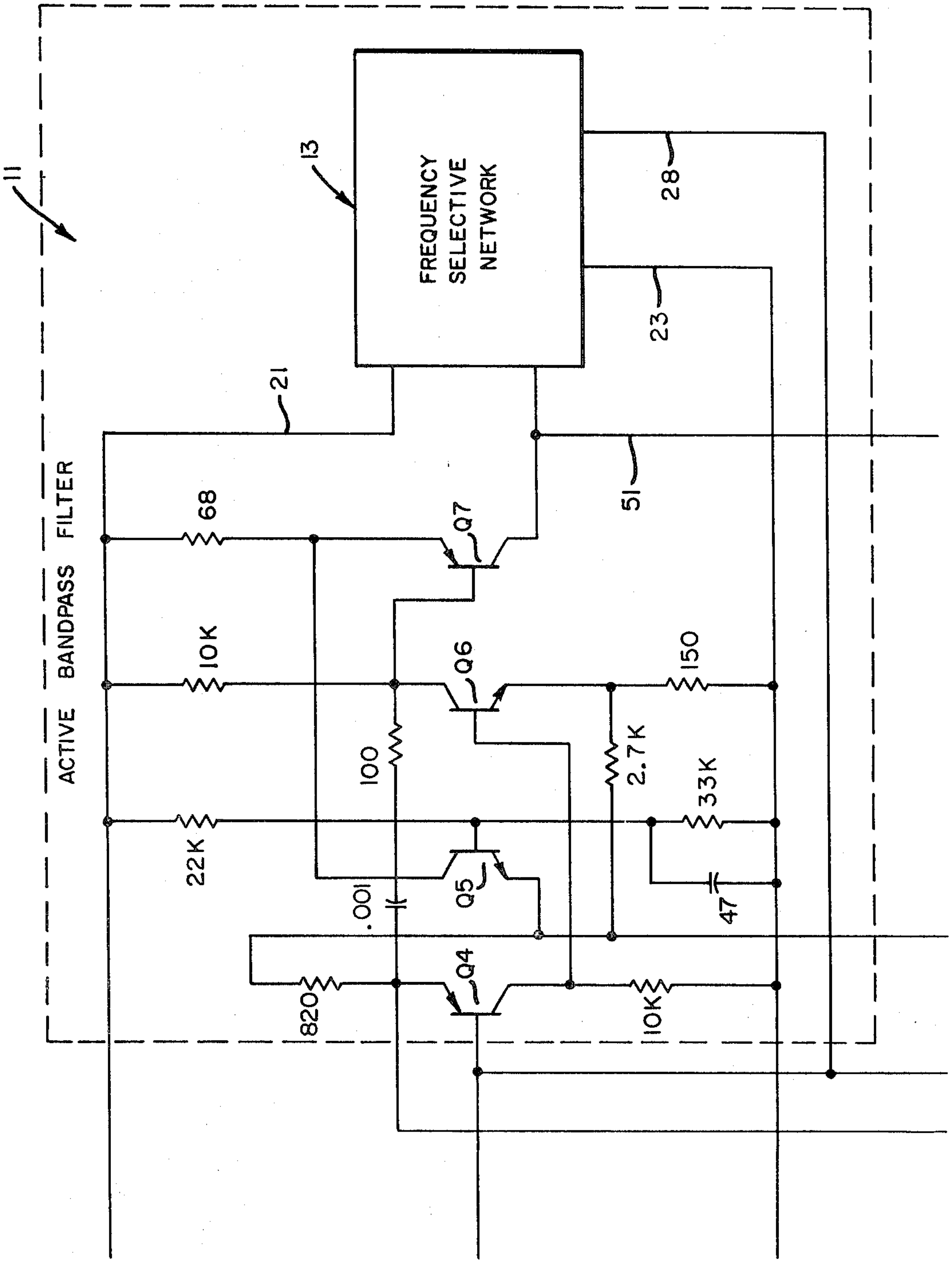
Figure 1C:
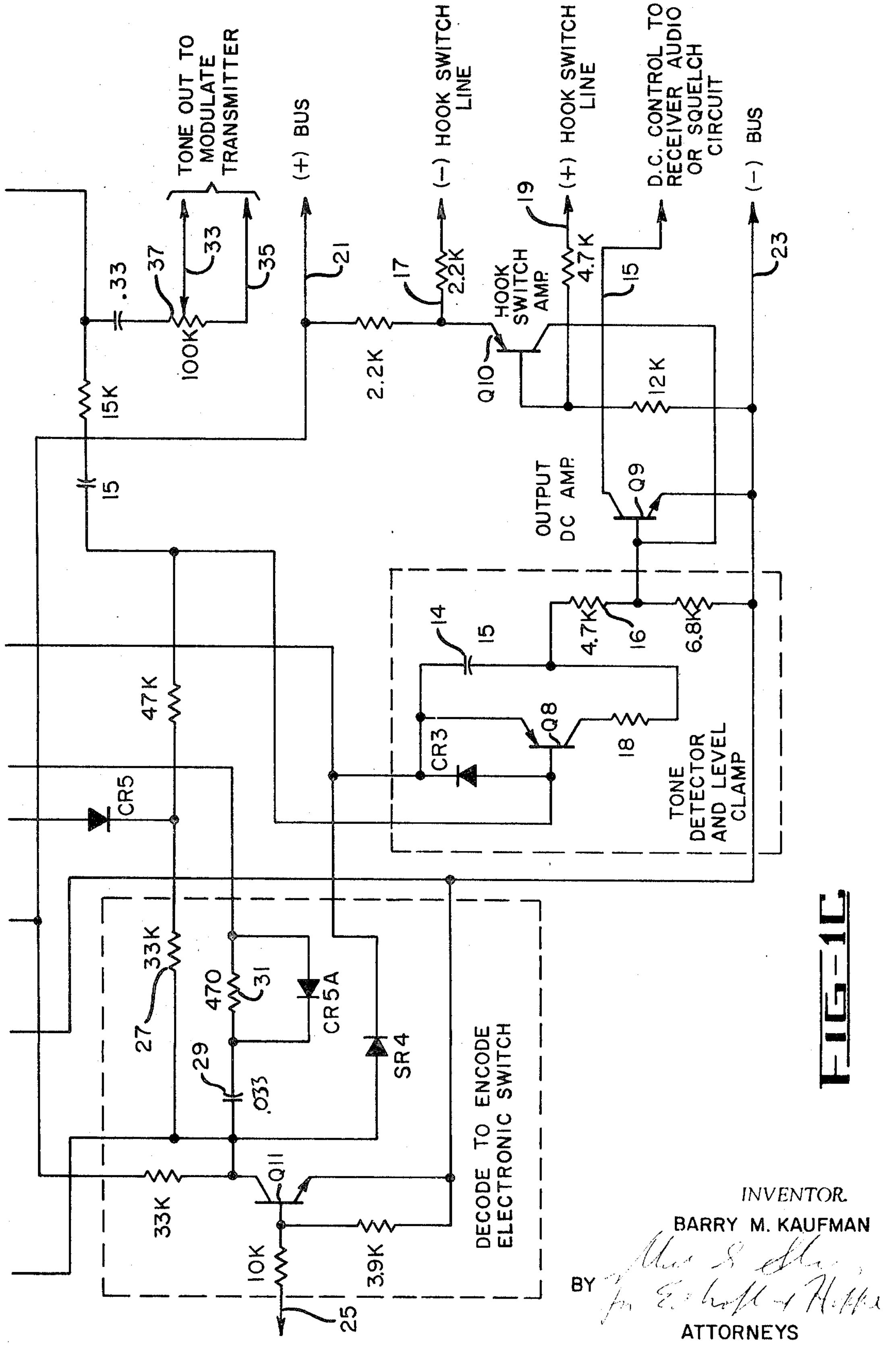

Referring now to FIG. 1, there is shown a circuit diagram of an all solid state, all electronic encoder-decoder system of the CTCSS type. The operation of the circuit will first be described in the receive mode.

A portion of the signal from the radio receiver discriminator is fed to terminal 5 into an active low pass filter generally designated 7 which includes transistors Q-1 and Q-2 and associated circuitry which form the active low pass filter. Voice noise and other signals above 250 Hertz are rejected by the filter while all subaudible tone channels below 250 cycles are passed by the active filter and amplified by transistor Q-3 and passed to the back-to-back connected diodes CR-1 and CR-2. These diodes limit the signal level to approximately 1 volt peak-to-peak over a wide dynamic range of input signal level from the discriminator and the signal is fed through line 9 to the active band pass filter generally designated 11.

Transistors Q-4, Q-5, Q-6 and Q-7 plus associated components and circuitry form a high gain operational amplifier. The active band pass filter includes a null frequency selective network 13, hereinafter described in detail, and this network is connected by lines 51 and 28 in the negative feedback loop between the collector of transistor Q-7 and the base of transistor Q-4. This amplifier in conjunction with the frequency selective network forms a band pass amplifier having a very high gain at the selected frequency. Naturally, the amplifier exhibits very low gain at all other frequencies to achieve the desired band pass characteristics. Thus, although a wide band of frequencies may be fed into the filter through line 9, all will be excluded except the resonant frequency of the network 13 and this frequency will be greatly amplified and appear at the collector of transistor Q-7.

The output signal from the collector Q-7 is fed to the base of transistor Q-8 through the resistor and coupling capacitor shown. Transistor Q-8 is biased in such a manner that its base is very slightly more positive than its emitter and it is thus normally cut off. However when a tone appears at the base of Q-8, it will be driven into conduction on negative halves of the cycle and pulses of collector current will rapidly discharge capacitor 14 and cause a voltage to be developed across resistor 16. Transistor Q-9 is normally cut off but when the voltage is developed across resistor 16, transistor Q-9 will be caused to conduct. As transistor Q-9 conducts, a voltage is developed across lead 15 which leads to the receiver audio or squelch circuits. This lead is wired into the receiver in such a manner that, even though a signal is received, the receiver will not become unsquelched until transistor Q-9 conducts. The radio/receiver will therefore only unsquelch if the filter senses a correct tone frequency introduced through line 5 which causes transistors Q-8 and Q-9 to conduct.

Although in normal operation, one would only wish to listen to a properly encoded message, it is essential that means be provided to defeat the coding so that just prior to a transmission the operator can listen for anything on the channel and thus avoid interference. This is normally accomplished by means of a hook switch on the operators microphone. Naturally a toggle or other suitable switch could also be provided for this purpose. To defeat the tone squelch system, DC amplifier transistor Q-10 is provided which is normally cut off due to reverse emitter bias. If Q-10 is made to conduct, its collector current will flow to the base of Q-9 causing that transistor to conduct and unsquelch the radio receiver, regardless of whether or not a tone of any frequency is coming through the active band pass filter 11, thus defeating the tone squelch and rendering the receiver operative to all signals. Transistor Q-10 is so arranged that the hook switch line may be referred to either the positive or negative bus of the power supply. Thus, one hook switch line 17 is connected to the emitter of Q-10 while a second hook switch line 19 is connected to the base of Q-10. If line 19 is returned to terminal 21, the positive buss, transistor Q-10 will be made to conduct if terminal 17 is floating or be made to cut off if terminal 17 is connected to terminal 23, the negative bus. If, instead, terminal 17 were returned to minus bus 23, the amplifier would be made to conduct if terminal 19 were left floating or would be made to cut off if terminal 19 were returned to terminal 21, the positive bus. In this manner, the hook switch can be referred to either the positive or negative terminal depending which is more convenient in the particular circuitry employed in the transceiver.

The operation of the device will now be described in the transmit function. When the radio transmitter is keyed, the active filter must be made to oscillate at the frequency of the frequency selective network. A positive keyed voltage is applied to terminal 25. This voltage is coupled to the base of the electronic switching transistor Q-11. In the decode (receive) mode, Q-11 is cut off and its collector is at approximately half battery voltage and is clamped at this point by diode SR-4 which is returned to the emitter of emitter follower Q-5. When Q-11 is made to conduct by the application of the voltage through line 25, its collector will be driven to the voltage of the negative bus and diode CR-4 will become reversed biased. Diode CR-5 which previously had been in the reverse biased state will now be made to conduct due to the forward current developed across resistor 27. A positive feedback path will now be established from the collector of Q-7 through the capacitor and resistor shown and through the forward conducting diode CR-5 to the emitter of transistor Q-4. The circuit will now oscillate at the null frequency of the frequency selective network 13 as this is the frequency of maximum amplifier gain (because of the null in the negative feedback path 28) and has the proper phase shift to sustain oscillation. The base-emitter junction of transistor Q-8 connected in parallel with diode CR-3 form a symmetrical clipper that limits amplitude of oscillation to the point where the operational amplifier is always operating in the linear mode.

Simply applying the positive feedback path to the operational amplifier would not ordinarily cause oscillation to commence immediately since a time lag is involved in building up the oscillation level to a full amplitude in the highly selective, high Q active filter. In order to make oscillation buildup practically instantaneous, capacitor 29, resistor 31 and diode CR-5A are employed. When the voltage is applied through line 25 and transistor Q-11 conducts, the negative going pulse at the collector of Q-11 is coupled through capacitor 29, resistor 31 and diode CR-5A to the base of transistor Q-4. This negative going transient being applied at the same moment that the positive feedback path is completed, immediately drives the circuit into oscillation at full amplitude. The desired tone appears at the collector of transistor Q-7 and is applied to terminals 33 and 35 to the radio transmitter audio input and the level at the terminals may be controlled through potentiometer 37.

When the circuit is switched to the encode or transmit position by the application of the keyed voltage through line 25, the signal passed from the receiver discriminator should be disabled as any signal coming from the receiver would be fed into the active filter and might cause interference to the tone encoding function. To accomplish this, diode CR-6A is employed. When transistor Q-11 is driven into conduction, its collector is driven to the negative bus and diode CR-6 which is normally reversed biased, becomes forward biased, bringing the base of transistor Q-3 to the negative bus. This cuts transistor Q-3 off, and prevents said transistor from amplifying the signal coming from the radio discriminator.

Figure 2:
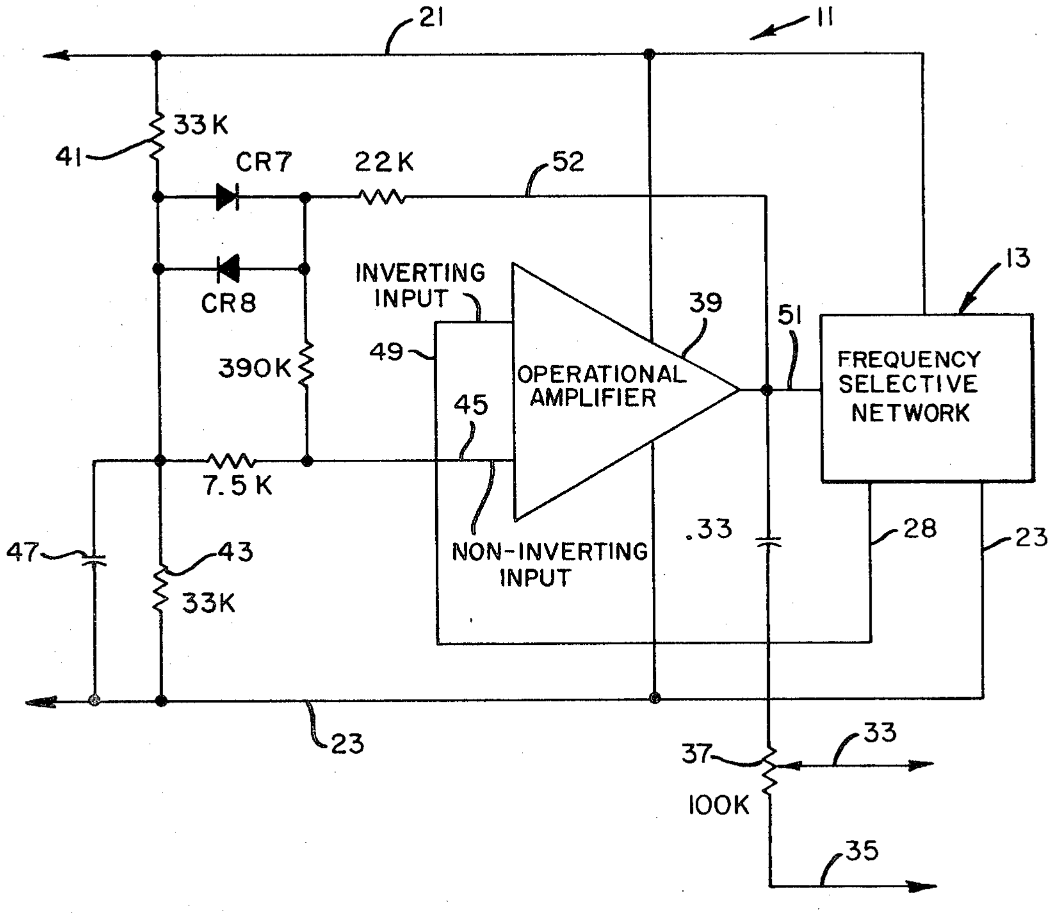
FIG. 2 is a schematic diagram of an operational amplifier employing a frequency selective network.

Having described the general circuitry, the active band pass filter will now be described in detail with reference to FIG. 2. The active band pass filter includes an operational amplifier 39 connected to the positive bus 21 and the negative bus 23. Resistors 41 and 43 form a voltage divider to supply operating bias to the noninverting input terminal 45 of amplifier 39. Capacitor 47 bypasses line 45 to the negative bus for AC so that noises coming in on the power line and tone frequency within the circuit are bypassed by this capacitor. The operational amplifier has an inverting input 49 and an output line 51 which leads to the frequency selective network 13. The negative feedback loop is completed from the frequency selective network to line 28 which connects to the inverting input 49. It will be seen that the inverting input 49 of FIG. 2 corresponds with the base of Q-4 in FIG. 1. Similarly, line 51 of the frequency selective network will correspond to the collector of Q-7 in FIG. 1. The frequency selective network 13 is of the type having a deep null at the desired frequency and this is placed in the negative feedback loop 28–49 of the amplifier. Used as an amplifier in the receive mode, the amplifier will have an extremely high gain at the null frequency and similarly, as previously described, when supplied with positive feedback, the circuit will oscillate at the null frequency.

Figure 3:
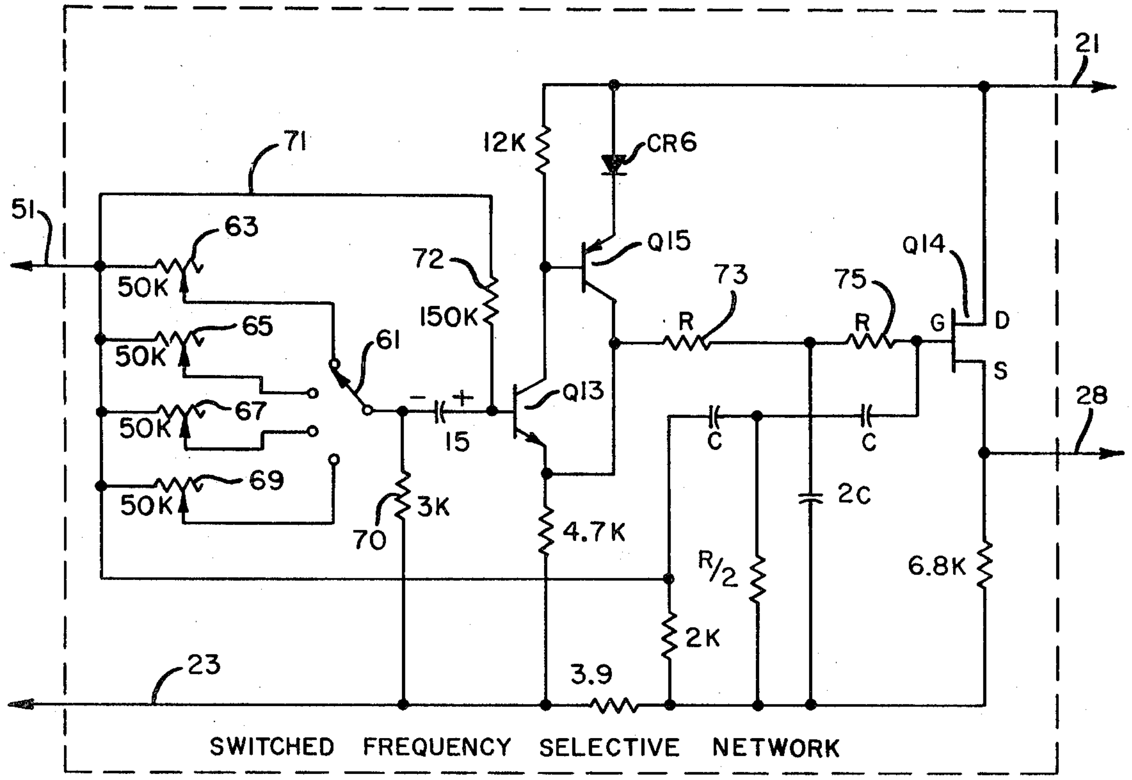
FIG. 3 is a diagram of a switched frequency selective network suitable for use in the present invention.
Figure 4:
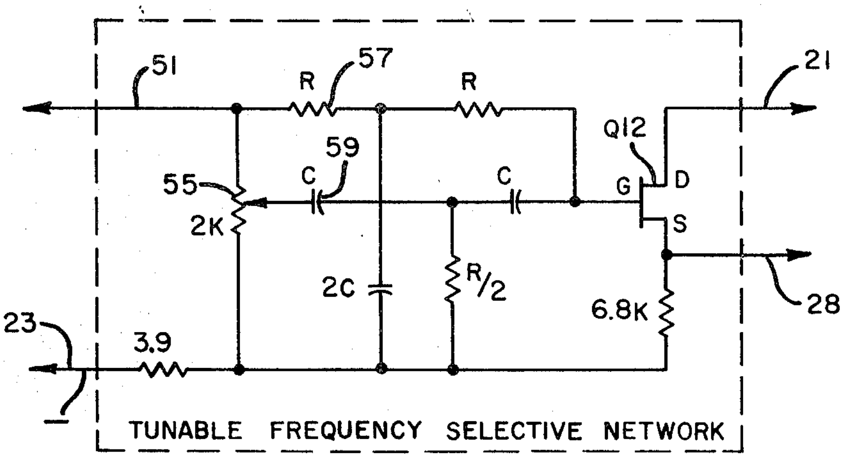
FIG. 4 is a diagram of a continuous tunable frequency selective network suitable for use in conjunction with the present invention.

In preferred embodiments of the device, the frequency selective network 13 takes the form of a 3 port tunable twin T notch network. Suitable circuits are shown in FIGS. 3 and 4 wherein FIG. 3 is a switched frequency selective network while FIG. 4 shows a continuously tunable selective network. The basic network is the same in both figures and is a 3 port tunable twin T notch network, which acts as the frequency selective filter. Such a network acts as an almost perfect null when all the components are carefully matched. If a high gain amplifier is provided with this null network connected in a negative feedback loop of the amplifier, the amplifier's gain will rise at the null frequency, i.e. the networks null characteristic will be inverted by its connection in the amplifier and the amplifier will exhibit a narrow pass band characteristic. Similarly, if positive feedback is also provided to such an amplifier, the amplifier will act as an oscillator whose frequency is determined by that of the null network. Positive feedback is achieved through line 52 which is connected to output 51. Diodes CR-7 and CR-8 limit the amplitude of feedback and the positive feedback is inserted at 45. This circuit lends itself ideally to being a pass band filter or an oscillator at exactly the same frequency.

Referring now to FIG. 4, the frequency of the network is primarily determined by the input potentiometer 55. If this potentiometer is at any intermediate point, the signal level fed to the resistor 57 and capacitor 59 will be different in amplitude but identical in phase. Varying settings of this potentiometer 55 change the frequency of the network which can be varied over about two octaves. Turning the potentiometer down, (toward the negative bus 23) raises the frequency while turning it up toward positive bus 51 lowers the frequency. The use of a field effect transistor Q-12 is highly advantageous in this circuit since such a network exhibits highest Q and highest notch depth stability when its input ports see a very low driving impedance and its output port looks into an extremely high load impedance. The low driving impedance is a normal function of most commercially available operational amplifiers. The field effect transistor is particularly effective in this application since at this frequency range it exhibits a virtually infinite input impedance. The circuit shown in FIG. 4 comprises a continuous tunable frequency selective network by changing the setting of potentiometer 55.

A somewhat more complex circuit is shown in FIG. 3 and this circuit includes a number of tunable preset circuits which can be selected by the switch 61. Thus, by suitably setting the switch, any of the variable resistances 63, 65, 67 and 69 can be switched into the circuit and each of these can be varied by changing the value of the particular resistor involved. Further, this circuit has been modified over that shown in FIG. 4 by providing a DC negative feedback factor of almost unity which leads to extremely stable operation. The operational amplifier output for DC is fed into line 71 through resistor 72 to the base of transistor Q-13. AC is fed to the base of Q-13 through a voltage divider consisting of one of the selected resistors 63-9 resistor 70 and then a coupling capacitor. The collector of transistor Q-15 is DC coupled through resistors 73 and 75 to the gate of field effect transistor Q-14 while the source of transistor Q-14 is direct coupled to the inverting input of the operational amplifier. The unity gain, negative feedback amplifier Q-13, Q-15, CR-6 and associated components, exhibit a very high input impedance and a very low output impedance. This impedance transforming amplifier causes negligible loading to the output of the frequency determining attenuator while at the same time the amplifier supplies a low source impedance to the respective input port of the twin T network.

The system of the present invention lends itself to remote control. Thus, the tone encoding circuitry could be in the trunk of the car where the mobile radio is, in fact, inside the case of the mobile radio and the control switch 61 that switches tone frequency can be in the control head of the cab of the vehicle. The impedance of these switch leads is low enough too allow 20 or 30 feet of cable to interconnect the switch to the associated circuitry. This feature allows a minimum of components to clutter up the area around the dashboard. Multifrequency-switched operation is not limited to the network of FIG. 3. The network of FIG. 4 is suitable as well. For, if we replace potentiometer 55 with a plurality of fixed precision resistors, and if appropriate taps are brought out from resistor junctions to a selector switch, we then have a network equivalent in function to, but not quite as versatile as the network of FIG. 3.

Although certain specific components had been mentioned, it will be understood that the invention is one of broad applicability and that these specific values have only been given for purposes of illustration. For instance, although a tunable T network is preferred in the negative feedback loop, other networks can be substituted. Similarly, the tuning has been described in terms of a resistive voltage divider but inductive, capacitive or electronic synthesis means can be substituted. Any of these schemes permit tuning by means of a single variable component.

I claim:

1. In a continuous tone controlled squelch radio system wherein an encoder-decoder is employed utilizing a tone having a frequency of less than 300 Hz., the improvement comprising an active low pass filter and a tunable active band-pass filter including a null frequency selective network having a negative feedback loop and having resistive means inserted in said loop, whereby said resistive means determines the frequency of said network, said encoder-decoder including a decode-encode electronic switch and a tone detector and level clamping transistor circuit interconnected with said active low pass filter and said tunable active band-pass filter including said null frequency selective network wherein:

a. the input of said active low pass filter being a signal from the radio receiver discriminator and the output of said active low pass filter connected to base of a first transistor of said tunable active band-pass filter, b. the collector of said decode-encode electronic switch connects to the base of an output transistor of said active low pass filter and also connected to the emitters of the first and second transistors of said tunable active band-pass filter, c. the collector of the output transistor of said tunable active band-pass filter connected to the base of said tone detector and level clamping circuit transistor and to said negative feedback loop, d. said negative feedback loop interconnecting said null frequency selective network to the base of said first transistor and collector of said output transistor of said tunable active band-pass filter and to the base of said tone detector and level clamping circuit transistor, e. said null frequency selective network connected in said negative feedback loop between the base of said first transistor and collector of said output transistor of said tunable active band-pass filter, and f. said tone detector and level clamping circuit transistor controlling the operation of a DC output amplifier transistor which provides the DC control signal to a receiver squelch circuit.

2. The system of claim 1 wherein said network is a tunable T notch network.

3. The system of claim 1 wherein the resistive means comprises a continuously variable resistor.

4. The system of claim 1 wherein the resistive means comprises a plurality of switched resistors.